April 22, 1947.    J. O. MOTSENBOCKER, JR    2,419,278
INSULATED PIPE
Filed June 30, 1945

INVENTOR
J. O. MOTSENBOCKER JR.
BY  Hudson & Young
ATTORNEYS

Patented Apr. 22, 1947

2,419,278

UNITED STATES PATENT OFFICE 2,419,278

INSULATED PIPE

James O. Motsenbocker, Jr., Phillips, Tex., assignor to Phillips Petroleum Company, a corporation of Delaware Application June 30, 1945, Serial No. 602,431

3 Claims. (Cl. 138—64)

This invention relates to insulated pipe. In a more specific aspect it relates to a corrugated end plate for joining the ends of two concentric pipes. In another specific aspect it relates to pipe having internal insulation and a second pipe inside said insulation wherein it is desired to substantially seal off the insulation from the fluids in said inner pipe.

One object of the invention is to devise an end plate for substantially sealing insulation within lined pipe, at the same time providing for differential expansion of the hot inner pipe relative to the cooler outer pipe.

Another object is to provide an insulated pipe composed of a cheap outer pipe, made for example of carbon steel, that will take the stresses involved and which will be kept cool by insulation while the insulation is protected in turn by a high temperature resisting alloy liner joined to said outer pipe by suitable end plates.

Another object is to devise an insulated pipe.

Another object is to devise an end plate.

Numerous other objects and advantages will be apparent to those skilled in the art upon reading the accompanying specification, claims and drawings.

In the installation and use of lined pipe, considerable difficulty had been encountered in the loss of insulation from the annular space between the carbon steel shell and alloy liner pipe. This resulted in hot spots which greatly overstressed the carbon steel shell and flanges as well as fouling the catalyst cases and disrupting the flow in the lines due to the loose insulation that was blown out and carried along in the lines. This was often accompanied by a collapsing of the liner which caused a further increase in pressure drop through the system. It was ascertained that the loss of insulation occurred at the junction of the liners between flanges. To overcome this problem it was necessary to design an end plate meeting the following requirements:

(a) One which would connect the liner to the shell providing a positive seal between the two, preventing high velocity gases carried in the liner from entering the annular space between the alloy liner and the carbon steel shell, thus eroding the insulation.

(b) The end plate must allow movement due to the difference in expansion between the extremely hot alloy liner and the relatively cooler carbon steel which occurs with various temperature changes due to cyclic operation.

(c) It must allow for a minute amount of breathing to relieve any differential pressure between the liner and the annular space.

(d) It must not interfere with the removal of any individual section of the line.

(e) It must be able to take care of its own lateral expansion across its face resulting from the temperature differential between the liner and shell.

Figure 1:
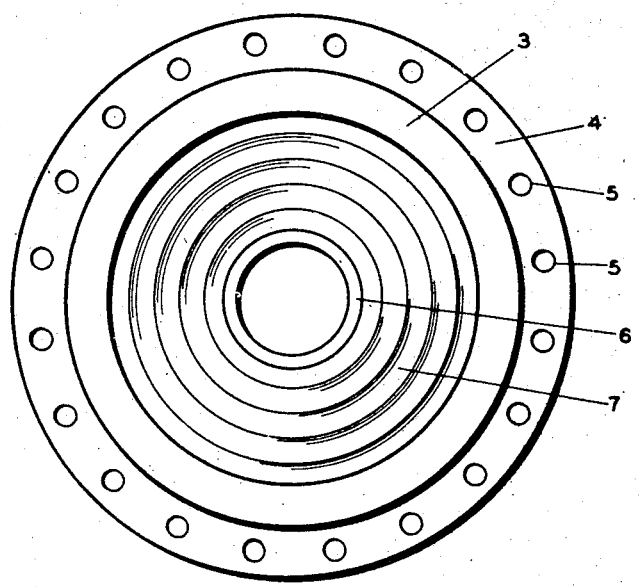
Figure 1 is an end view of an insulated pipe embodying my invention.

In Figure 1 a pipe head 3 is provided with a radial flange 4 perforated at 5 for bolting to the next adjacent pipe head (not shown). Suitable gaskets or packing (not shown) may be positioned between adjacent surfaces 3 and may if desired extend out to be guided by the bolts (not shown) which pass through holes 5. The pipe head may be made of ordinary carbon steel, but of course other materials may be employed for this purpose.

Inside, and preferably concentric to head 3 is an inner liner 6 which preferably is made of some suitable heat resisting alloy, such as 18-8 or 25-20 nickel chrome or 27 chrome stainless steel, but of course other superior or inferior materials resistant to the degree of heat expected may be employed if desired. Inner liner 6 is connected to head 3 by means of an annular disk 7 said disk having annular corrugations perhaps more clearly shown in Figure 2.

Figure 2:
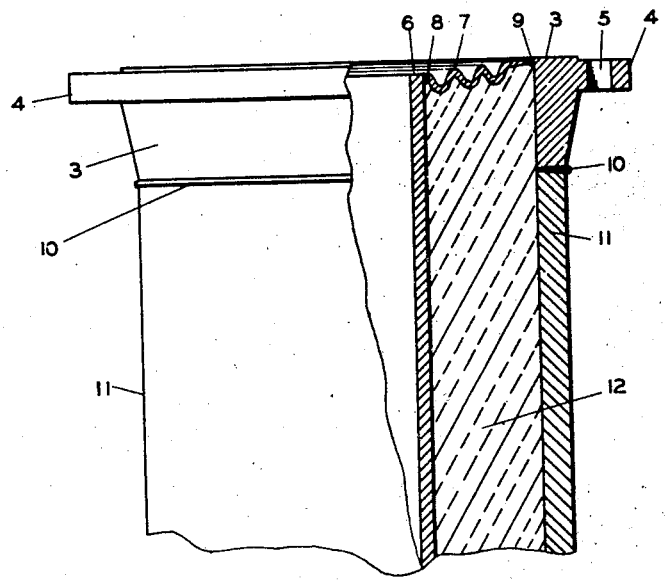
Figure 2 is an elevational view with parts in section of the insulated pipe shown in Figure 1.

In Figure 2 the connection welds between annular disk or plate 7, the pipe head 3, and inner liner 6 are clearly shown. Plate 7 is preferably welded at 8 to inner liner 6 by a continuous bead of a suitable welding material, such as a 25-20 chromium nickel welding rod, but of course other welding materials can be used. Plate 7 is preferably welded at 9 to head 3 with a staggered bead about 2 inches long at intervals of about 2 inches. The staggered welds between end plate 7 and head 3 provide for breathing if such is deemed necessary. The same welding material may be employed at 9 as at 8.

Head 3 is shown welded at 10 to outer shell or pipe 11 as is common practice but 3 and 11 could be integral as well 10 is no part of the present invention. Between pipes 6 and 11 suitable insulating materials may be disposed. A list of suitable insulating materials will be found on page 2 column 2 lines 20 to 62 of the U. S. Patent to Coffman 2,361,383 of October 31, 1944. Material 12 can be poured, like wet concrete, between pipes 6 and 11, or can be cast in pipes and slid in place between pipes 6 and 11 before the last plate 7 is installed.

While end plate 7 may be made of various materials, preferably the same as pipe 6, and the shape and proportions of 7 may be varied considerably without departing from my invention, the following example gives the dimensions and other details of a successful end plate embodying my invention:

EXAMPLE

In an effort to check the anticipated operating life, tests were conducted on a corrugated end plate to be used for sealing the insulation into inside insulated pipe. The corrugated end plate, invented by Mr. J. O. Motsenbocker, was tested in apparatus (not shown) invented by Messrs. E. L. Martin and L. J. Weber.

The 8" I. D. x 16" O. D. corrugated end plate was stamped from a 16 B. W. G. sheet of 18-8 stainless steel. There were four concentric corrugations ½" deep and ⅞" from center to center. The plate was welded to the alloy liner and carbon steel flange with a single pass of 25-20 Cr-Ni rod. The liner motion to simulate expansion of the liner was imparted by an adjustable crank arm on a gear reducer driven by an electric motor (not shown). Flue gas was provided by a gas burner in the line 18" below the corrugated plate. Temperatures were observed on the flue gas at the center of the liner and on the end plate at the junction of the liner and plate.

A flexure of the plate of approximately ⅛"-¼" at the rate of 10 cycles per minute was maintained throughout the experiment. For the initial conditions a flue gas temperature of 900°-1200° F., with temperatures of 400°-700° F. at the junction of the plate and liner, was maintained for 5 days and 5 hours. At the end of this period a 5" long hair-line crack had developed in the weld at the junction of the plate and liner. Thus, the plate has been flexed 75,000 times at normal operating temperatures, the equivalent of 19 years and 10½ months of cycle operation.

The crack in the weld was repaired and the test continued at the same rate of flexure at 1350°-1500° F. flue gas temperature, with 850°-1000° F. at the junction of the plate and liner. Operations continued for 16 hours at these temperatures without a failure, so the temperature was raised to 1700° F. on the flue gas and 1200° F. on the inner rim of the plate. The liner was found broken away from the weld after 5 hours of operation at these higher temperatures. Thus, a total of 21 hours (12,600 cycles) of flexure at temperatures of 850-1200° F. on the rim, or 1350°-1700° F. flue gas, was obtained before failure occurred. This is an equivalent of 150 days of cyclic operation at temperatures greatly exceeding anticipated operating temperatures.

Since the aging effect at operating temperatures could not be duplicated, an operation life of five years might safely be anticipated before any failure. And failures such as occurred during the test would propably cause less loss of insulation than occurs with present joint seals.

Contrasted to this operating life of five years for the present invention, I have found that the devices of the prior art used in similar service have an average life of 3 days. Once even a small crack develops the high temperature high velocity fluids tear out the insulation in a very few minutes and burn a hole in the outer carbon steel pipe. This causes an expensive shut down and the expense of replacing pipes every three days is very large. With the present invention which has a life of five years the cost of shut down and replacement becomes negligible.

Operation

Pipe 6 is placed inside pipe 11 and one end plate 7 welded in place at 8 and 9. Insulation 12 is then poured between 6 and 11. However insulation 12 could be cast inside 11 before 6 is inserted; or could be cast on the outside of 6 and inserted therewith; or could be cast as a separate pipe and inserted between 6 and 11 in any order or simultaneously and end plate 7 welded at 8 or 9 whenever convenient in the process. When the other end plate 7 (not shown) is welded in place at the other end of the pipe, the pipe is complete. The pipes are assembled by bolts and gaskets (not shown) the bolts passing through holes 5 and drawing adjacent flanges 4 together.

Hot fluid is passed through the pipe. Pipe 6 expands more than pipe 11 as 11 is out in the air whereas 6 is adjacent the fluid and insulation 12 lies between. The annular corrugations in end plates 7 take care of all lateral expansion across the face of the plate as well as any flexing resulting from the differential in longitudinal expansion between the pipe 6 and pipe 11. Any breathing necessary by the insulation is done through the small crevices left between the staggered beads of weld 9. These crevices, or any cracks that may develop, are too small to act as a passage through which any substantial amount of insulation 12 could be lost. In case no breathing spaces are left in weld 9 the pipe or liner 6 and end plates 7 will have to undergo suitable strain to meet the stresses set up by increased pressure in 12 as it is heated.

While the breathing spaces could be in weld 8, or in both 8 and 9 it is preferred to have them in 9 only as weld 9 has a greater length than weld 8 and can better stand the resultant weakening.

While changes in materials and proportions of parts may be made within the scope of my invention the preferred materials and proportions give unexpected superior results, and the scope of the invention is defined only by the following claims.

Having described my invention, I claim:

1. An insulated pipe comprising in combination an outer pipe, an inner liner tube, heat insulating material between said inner liner and said outer pipe, and end plates connecting the ends of said liner and said outer pipe, said end plates comprising annular plates having concentric corrugations therein whereby differences in expansion between said liner and said outer pipe are taken up by movement of said end plate corrugations.

2. The combination of claim 1 in which the end plates are welded to the inner tube and the outer pipe.

3. The combination of claim 1 in which the end plates are welded to the inner tube and the outer pipe and in which breathing spaces are left in at least one of said welds to allow slow relief of pressure differences without loss of insulating material.

JAMES O. MOTSENBOCKER, Jr.

REFERENCES CITED

The following references are of record in the file of this patent:

UNITED STATES PATENTS

| Number | Name | Date |
|---|---|---|
| 1,333,840 | Davis et al. | Mar. 16, 1920 |
| 2,331,685 | Herder | Oct. 12, 1943 |
| 2,331,645 | Altorfer et al. | Oct. 12, 1943 |
| 2,376,892 | Avigdor | May 29, 1945 |